US006908232B2

(12) United States Patent
McColloch et al.

(10) Patent No.: US 6,908,232 B2
(45) Date of Patent: Jun. 21, 2005

(54) FIBER OPTIC CONNECTORS AND METHODS OF MAKING THE SAME

(75) Inventors: Laurence R. McColloch, Santa Clara, CA (US); James A. Matthews, Milpitas, CA (US); Robert E. Wilson, Palo Alto, CA (US); Brenton A. Baugh, Palo Alto, CA (US); Tanya J. Snyder, Edina, MN (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/393,809

(22) Filed: Mar. 21, 2003

(65) Prior Publication Data

US 2004/0184738 A1 Sep. 23, 2004

(51) Int. Cl.[7] .............................. G02B 6/36; G02B 6/38
(52) U.S. Cl. .......................................... 385/53; 385/65
(58) Field of Search ........................... 385/53, 65, 147, 385/97

(56) References Cited

U.S. PATENT DOCUMENTS 5,590,232 A * 12/1996 Wentworth et al. ........... 385/92
6,287,017 B1 9/2001 Katsura et al.
6,474,877 B1 * 11/2002 Shahid ........................ 385/65
2002/0064347 A1 5/2002 Mertz et al.
2002/0126964 A1 9/2002 Blom et al.
2003/0113071 A1 6/2003 Kim et al.

FOREIGN PATENT DOCUMENTS

| EP | 1031B59 | 8/1999 |
| JP | 2002286005 | 10/2003 |
| WO | WO02/088810 | 11/2002 |
| WO | WO02/093696 | 11/2002 |
| WO | WO03/003070 | 1/2003 |

* cited by examiner

*Primary Examiner*—Chandrika Prasad

(57) ABSTRACT

Fiber optic connectors and methods of making the same are described. In one aspect, a fiber optic connector includes a support surface and at least one alignment pin. The support surface has at least one optical communication port. Each alignment pin has an elongated distal end and a flanged proximal end with a bottom surface that is fixedly attached to the support surface.

43 Claims, 9 Drawing Sheets

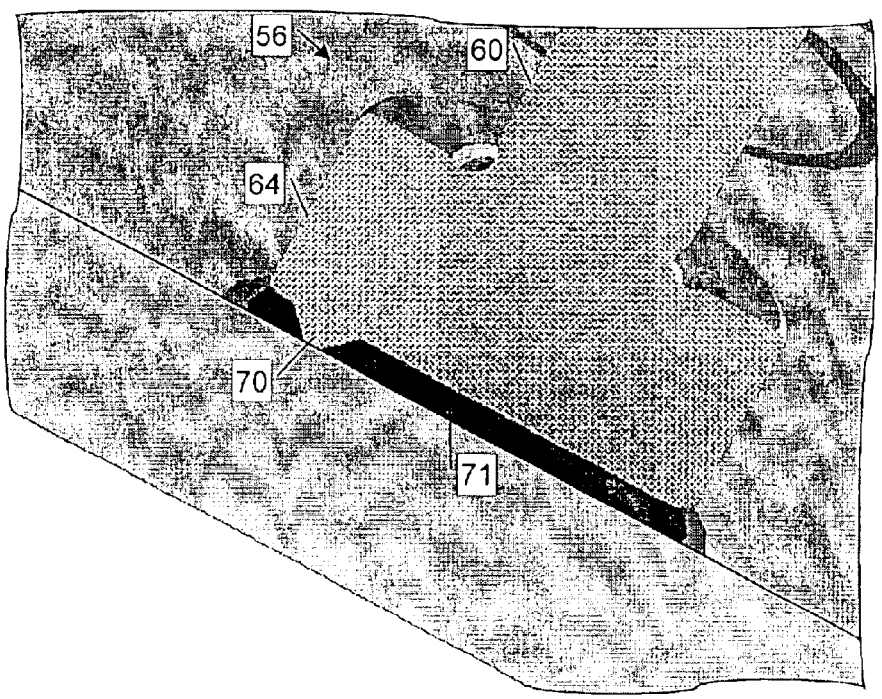
FIG. 5
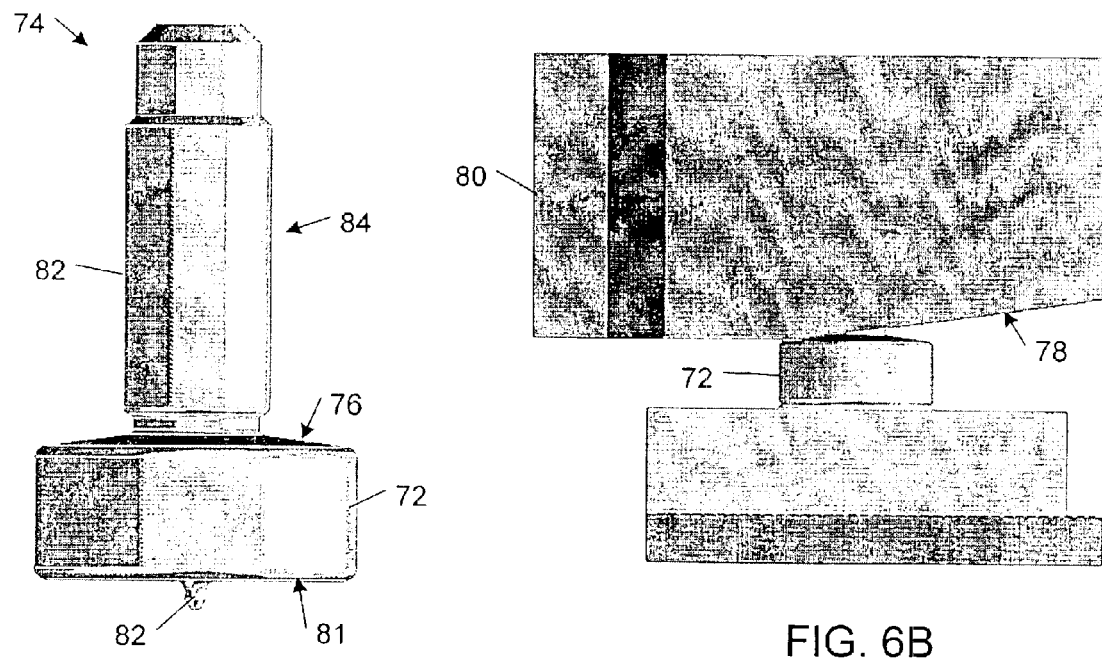
FIG. 6A
FIG. 6B

FIBER OPTIC CONNECTORS AND METHODS OF MAKING THE SAME

TECHNICAL FIELD

This invention relates to fiber optic connectors and methods of making the same.

BACKGROUND

A wide variety of different fiber optic connectors have been developed. Fiber-to-fiber fiber optic connectors have been developed to couple pairs of optical fibers together, and fiber-to-module fiber optic connectors have been developed to couple optical fibers to optical device modules. Relative to traditional metal connections, optical fibers have a much greater bandwidth, they are less susceptible to interference, and they are much thinner and lighter. Because of these advantageous physical and data transmission properties, efforts have been made to integrate fiber optics into computer system designs, metropolitan area networks (MANs), and wide area networks (WANs).

In order to achieve efficient and reliable transmission of optical data signals, optical components in the signal path must be aligned precisely. When aligning optical network components, there are three main elements which must be aligned precisely: the active regions of optoelectronic devices that transmit and receive the optical data signals; the optical lenses that focus and direct the optical signals; and the optical fibers that carry the optical data signals between the transmitters and receivers. Because optical fibers have such small dimensions, however, the alignment of these fibers with other fibers, lenses and optical devices is difficult and costly. Various factors affect the optic transfer efficiency at a connector including (a) gap separation at the point of abutment, (b) lateral separation due to axial misalignment, and (c) optical reflections within the connector.

Fiber optic connectors have been developed for single fiber cables and multi-fiber cables (e.g., parallel ribbon cables that include a plurality of optical fibers aligned in parallel). Exemplary fiber optic connectors include MAC™-type connectors, MPO-type connectors, and MT-RJ-type connectors. Many fiber optic connectors include an MT ferrule with two protruding alignment pins. The alignment pins help users to connect mating connectors in proper alignment and help to maintain mated connectors in fixed alignment during use.

SUMMARY

The invention features fiber optic connectors and methods of making the same.

In one aspect of the invention, a fiber optic connector includes a support surface and at least one alignment pin. The support surface has at least one optical communication port. Each alignment pin has an elongated distal end and a flanged proximal end with a bottom surface that is fixedly attached to the support surface.

In another aspect, the invention features a fiber optic connector that includes a support surface with at least one optical communication port and a pair of alignment pins. The alignment pins are coupled together by a resilient member and each has an elongated distal end and a flanged proximal end with a bottom surface that is fixedly attached to the support surface.

In another aspect, the invention features a method of making a fiber optic connector in accordance with which at least one alignment pin is provided. Each alignment pin has an elongated distal end and a flanged proximal end with a bottom surface. The proximal end bottom surface of each alignment pin is fixedly attached to a support surface with at least one optical communication port.

Other features and advantages of the invention will become apparent from the following description, including the drawings and the claims.

DESCRIPTION OF DRAWINGS

FIG. 5 is a diagrammatic cross-sectional view of the alignment pin of FIG. 4.

FIG. 6A is a diagrammatic side view of an alignment pin that has a flanged proximal end with a tapered stop edge.

FIG. 6B is a diagrammatic side view of the alignment pin of FIG. 6A connected to a mating fiber optic connector.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Overview

Figure 1:
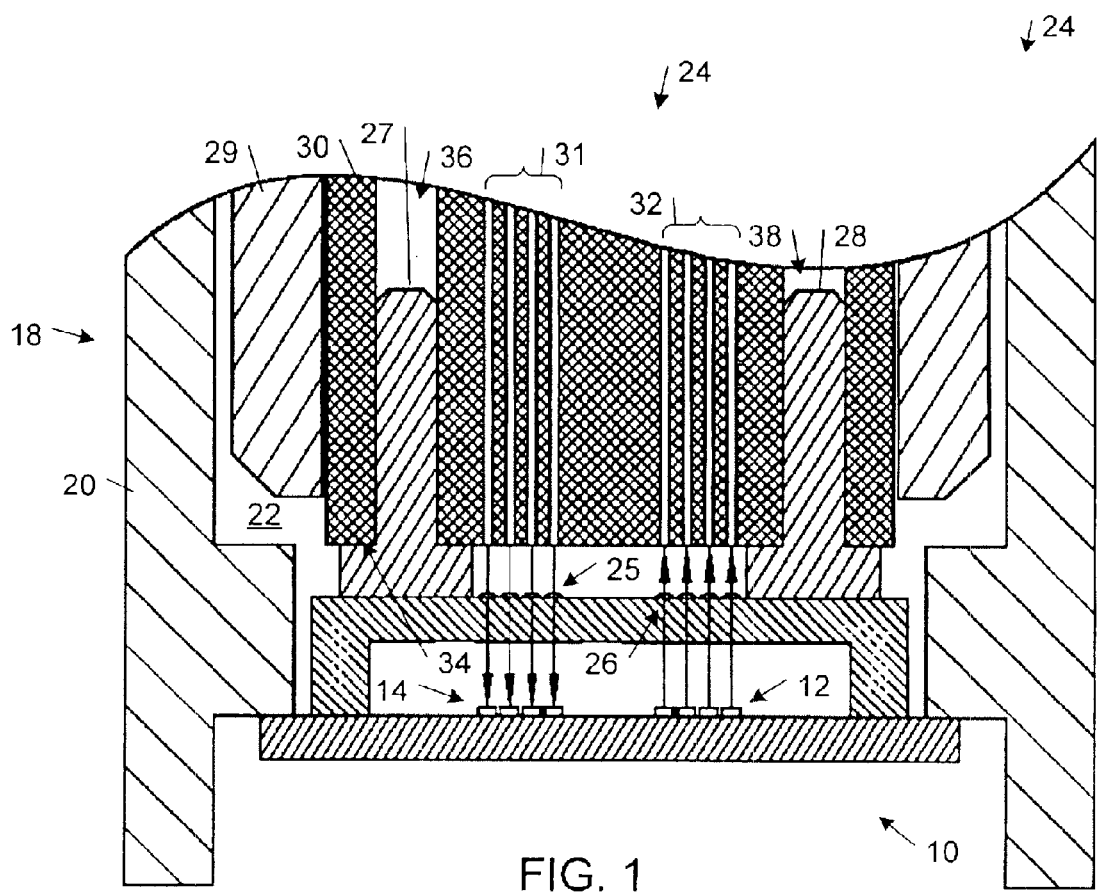
FIG. 1 is diagrammatic cross-sectional side view of an embodiment of a fiber optic connector connected to a mating prior art MT ferrule.

Referring to FIG. 1, in some embodiments, a fiber optic transceiver 10 includes an array of lasers 12, an array of optical detectors 14, and a package housing that includes a fiber optic connector 18. Fiber optic connector 18 includes a connector housing 20 that defines a receptacle 22 for receiving a mating fiber optic connector 24, two arrays of lenses 25, 26, and a pair of alignment pins 27, 28. The mating fiber optic connector 24 includes a body 29 and a ferrule 30 that contains two arrays of optical fibers 31, 32. In operation, the mating fiber optic connector 24 is inserted within receptacle 22 of fiber optic connector 18 until the front end of mating fiber optic connector 24 rests against stop edges 34 at the flanged proximal ends of the pair of alignment pins 27, 28. The alignment pins 27, 28 are interference fit within respective holes 36, 38 that are defined within ferrule 30. The alignment pins 27, 28 guide the array of optical fibers 32 into optical alignment with the arrays of lenses 25, 26. The heights of stop edges 34 above the lenses 24 are selected to optimize optical coupling between the arrays of optical fibers 31, 32 and the arrays of lenses 25, 26.

The array of lasers 12, the array of optical detectors 14, and the package housing may be formed in accordance with known optoelectronic fabrication processes. For example, the lasers 12 may be semiconductor lasers (e.g., vertical cavity surface emitting lasers) and the optical detectors may be semiconductor photodiodes. Lasers 12 and detectors 14 may be formed and aligned on a silicon substrate. In some embodiments, the package housing may include a quartz or silicon top that provides the support surface to which the flanged alignment pins 27, 28 are attached. The alignment pin attachment locations on the support surface may be gold-plated. In some embodiments, alignment pins 27, 28 are formed from an electrically conducting material (e.g., a metal, such as stainless steel). In other embodiments, alignment pins 27, 28 are formed of a substantially non-electrically conducting material (e.g., glass, ceramic, or silicon).

Figure 2:
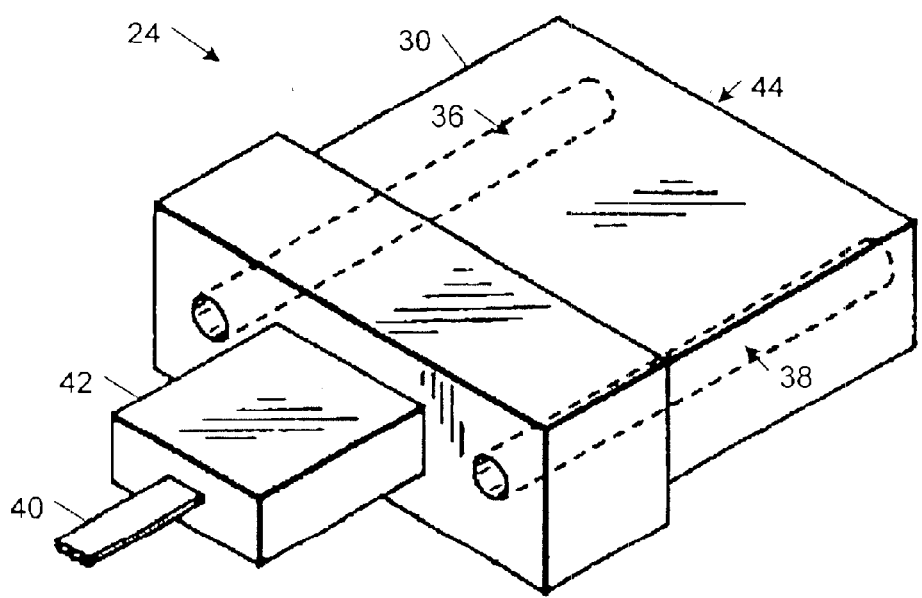
FIG. 2 is a diagrammatic perspective view of the prior art MT ferrule of FIG. 1.

As shown in FIG. 2, in some embodiments, one or more optical fibers are contained within a ribbon cable 40 that is coupled to ferrule 30 through a strain relief element 42. The forward ends of the optical fibers are stripped and separated from the ribbon cable 40 and are individually held in place within ferrule 30. The forward ends of the optical fibers extend to the forward face 44 of ferrule 30.

II. Flanged Alignment Pins

The fiber optic connector embodiments described below feature alignment pins with flanged ends that increase the stability and rigidity with which the alignment pins may be attached to a support surface, thereby improving the stability and reliability of optical connections between mating fiber optic connectors.

Figure 3:
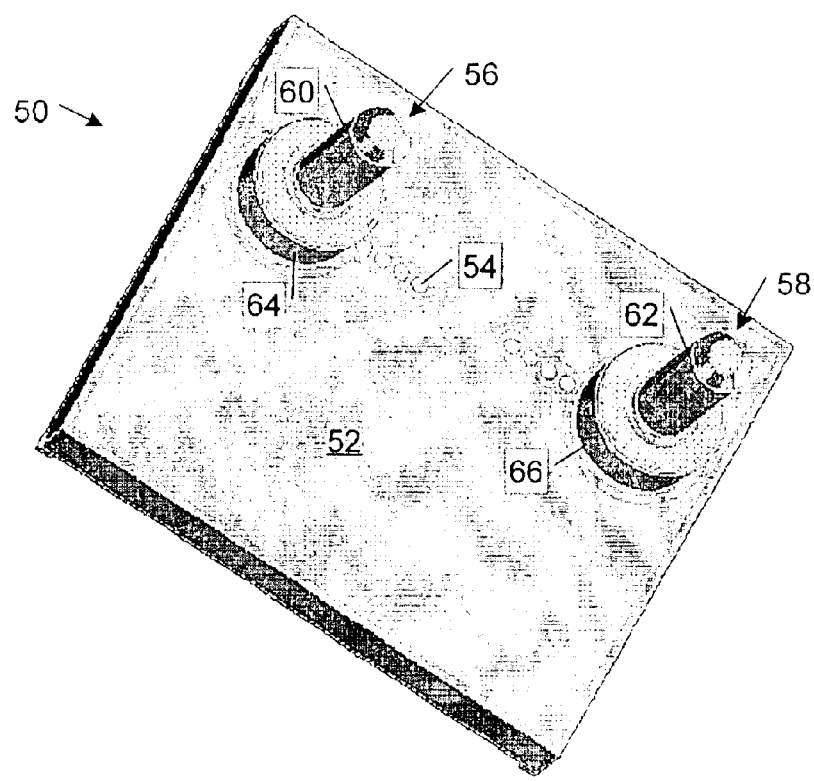
FIG. 3 is a diagrammatic perspective view of a portion of the fiber optic connector of FIG. 1, including a pair of alignment pins attached to a surface of an optical device module.
Figure 4:
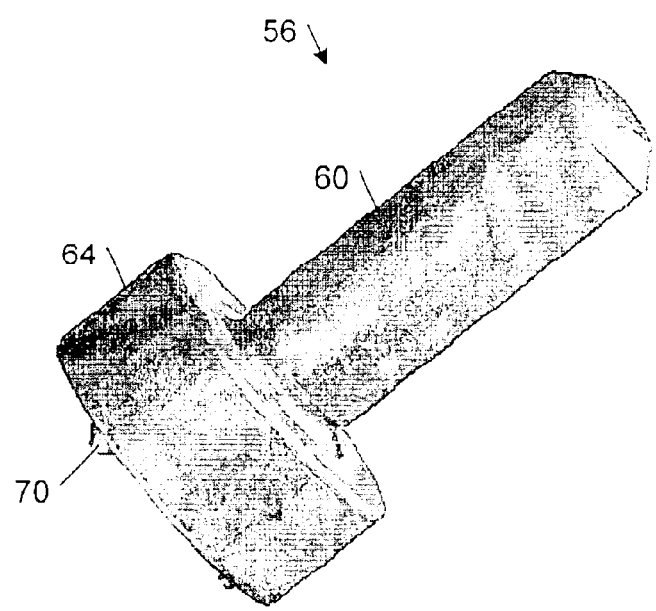
FIG. 4 is a diagrammatic perspective view of an alignment pin shown in FIG. 3.

Referring to FIGS. 3, 4, and 5, in one embodiment, a portion 50 of a fiber optic connector includes a support surface 52 with multiple optical communication ports 54 and a pair of alignment pins 56, 58. In the illustrated embodiment, each optical communication port 54 includes an optical lens. Each alignment pin 56, 58 includes an elongated distal end 60, 62 and a flanged proximal end 64, 66 with a bottom surface fixedly attached to the support surface 52. A portion of the distal end 60, 62 of each alignment pin 56, 58 is shaped in the form of a cylinder with a diameter of 0.698±0.001 millimeters (mm). The cylindrical distal ends 60, 62 may be formed by known machining or sizing techniques. The proximal end 64, 66 of each alignment pin 56, 58 is shaped in the form of a cylinder with a diameter of about 1.5 mm. The tip of each cylindrical distal end 60, 62 is tapered to facilitate insertion of the alignment pin into a corresponding alignment pin hole of a mating fiber optic ferrule. In the illustrated embodiment, alignment pins 56, 58 are formed from an electrically conducting material (e.g., a metal, such as stainless steel). The flanged proximal end 64, 66 of each alignment pin 56, 58 is attached to support surface 52 by spot welding and solder bonding, as explained in detail below.

As shown in FIG. 4, each alignment pin 56, 58 includes a set of three conical spot weld nubs 70 (only two spot weld nubs are shown in the view of FIG. 4) that protrude from the bottom surface the flanged proximal end 64, 66. In the illustrated embodiment, the three spot weld nubs 70 are equilaterally spaced on the bottom surface about the central axis of the alignment. In operation, after the alignment pins 56, 58 have been aligned on support surface 52, a current is applied to the alignment pins 56, 58. The electric current is concentrated at spot weld nubs 70 such that sufficient heat is generated to weld the spot weld nubs 70 to the support surface 52.

As shown in FIG. 5, after the spot weld nubs 70 have been tacked to support surface 52, the spaces between the support surface 52 and the bottom surfaces of the flanged proximal ends 64, 66 are filled with solder 71. The solder may be a metal solder (e.g., Sn), a conventional metal alloy (e.g., PbSn), or an intermetallic compound (e.g., AuSn, AuIn, AuGe, or SiC). The solder may be present in the joint at the time of spot welding or the solder may be back-filled into the joint after spot welding. In some embodiments, the component materials of a solder alloy may be located on opposite sides of the joint. In these embodiments, the component materials then may be heated in an oven until they melt to form an alloy joint.

Referring to FIGS. 6A and 6B, in some embodiments, the flanged proximal end 72 of an alignment pin 74 may include an edge stop 76 that is constructed so that an angled mating surface 78 of a mating fiber optic connector 80 is nonparallel to the support surface when resting against the edge stop 76. In the illustrated embodiment, edge stop 76 corresponds to a beveled surface on the MT ferrule that is oriented at an angle of 8% relative to the bottom surface 81. Alignment pin 74 includes a single spot weld nub 82 that flattens out during formation of the spot weld.

Alignment pin 74 also includes a distal end 84 that includes a fluted portion 86, which may be sized precisely using a die with a precision sizing hole. Alignment pin 74 may be formed of stainless steel and shaped by a metal injection molding process or a cold forming process, and then annealed. A precision die may be pressed over the fluted portion 86 to flow or move excess material, leaving a cylindrical portion with a precisely sized diameter. The fluted portion 86 reduces the amount of force required during the sizing operation. Different grooved patterns, such as concentric grooved rings, that provide a place for excess material to flow also may be used.

Figure 7:
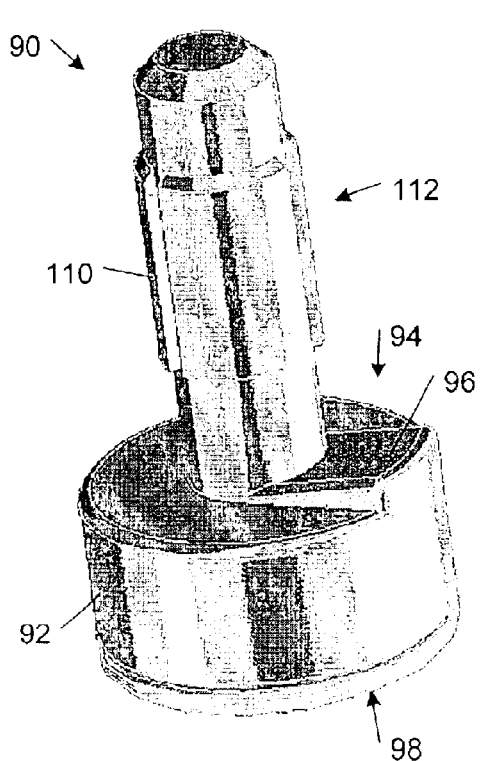
FIG. 7 is a diagrammatic perspective view of an alignment pin that has a wedge-shaped stop edge.
Figure 8A:
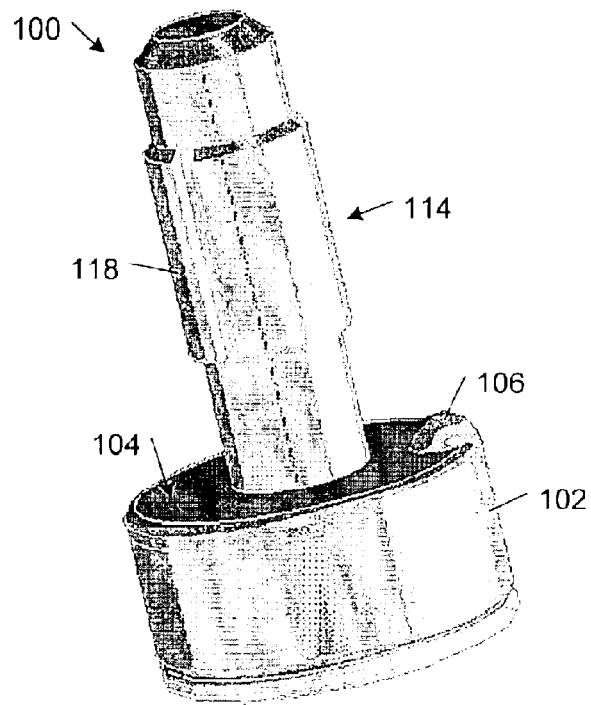
FIG. 8A is a diagrammatic perspective view of an alignment pin that has a bump-shaped stop edge.
Figure 8B:
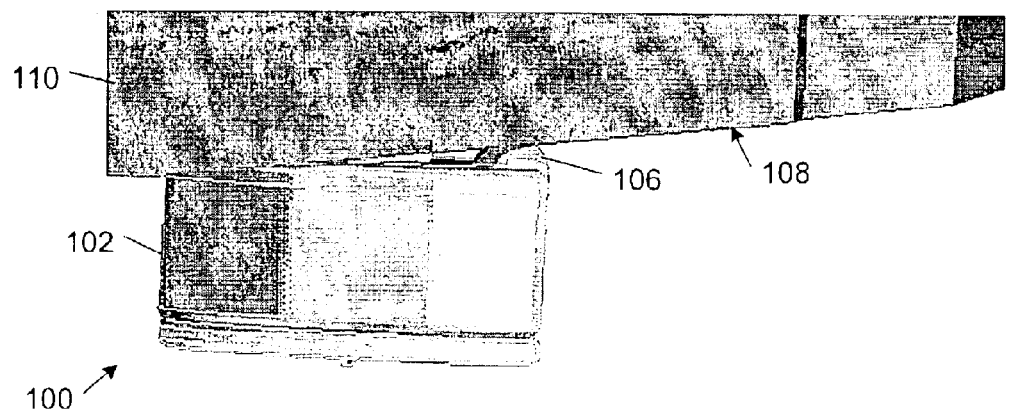
FIG. 8B is a diagrammatic side view of the alignment pin of FIG. 8A connected to a mating fiber optic connector.

Referring to FIGS. 7, 8A, and 8B, some embodiments may include features that protrude from the surface of the edge stop to accommodate an angled mating surface of a mating fiber optic connector. For example, as shown in FIG. 7, an alignment pin 90 may include a flanged proximal end 92 that includes a stop edge 94 with a wedge-shaped feature 96 that is inclined relative to the bottom surface 98. Alternatively, as shown in FIG. 8A, an alignment pin 100 may include a flanged proximal end 102 that includes a stop edge 104 with a bump-shaped feature 106. Referring to FIG. 8B, the size of the protruding feature (e.g., bump 106) is sized to accommodate an angled mating surface 108 of a mating fiber optic connector 110. Alignment pins 90 and 100 each includes a distal end 112, 114 that includes a fluted portion 116, 118, which may be sized precisely using a die with a precision sizing hole, as described above in connection with the embodiments of FIGS. 6A and 6B.

Figure 9:
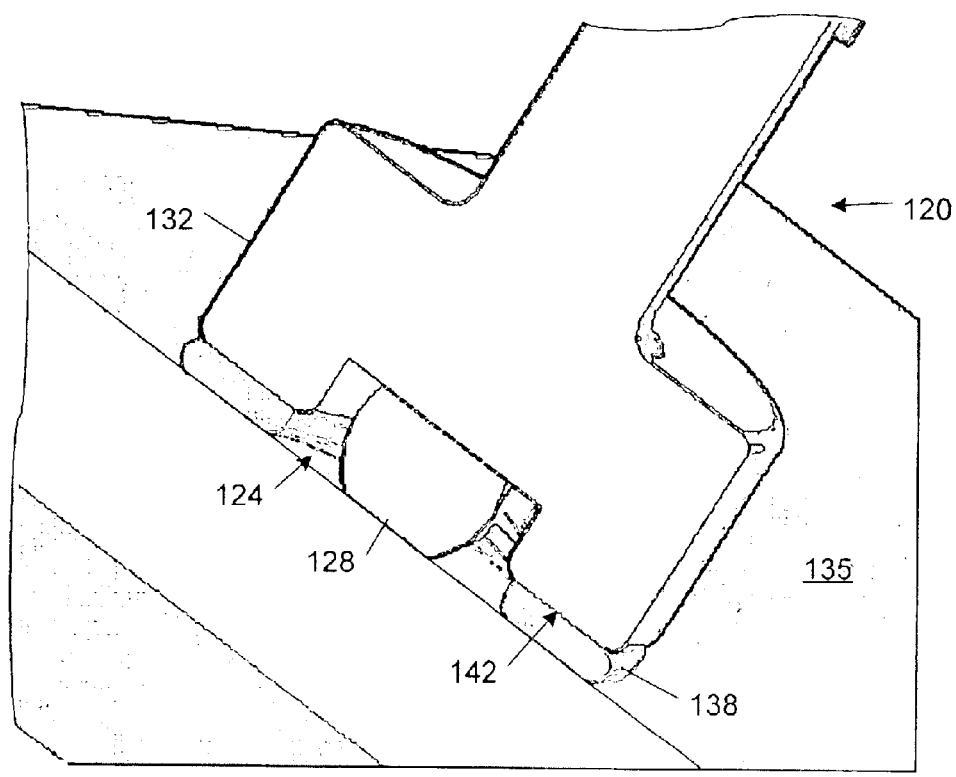
FIG. 9 is a diagrammatic side view of an alignment pin that has a recess containing a spherical tack weld element.
Figure 10:
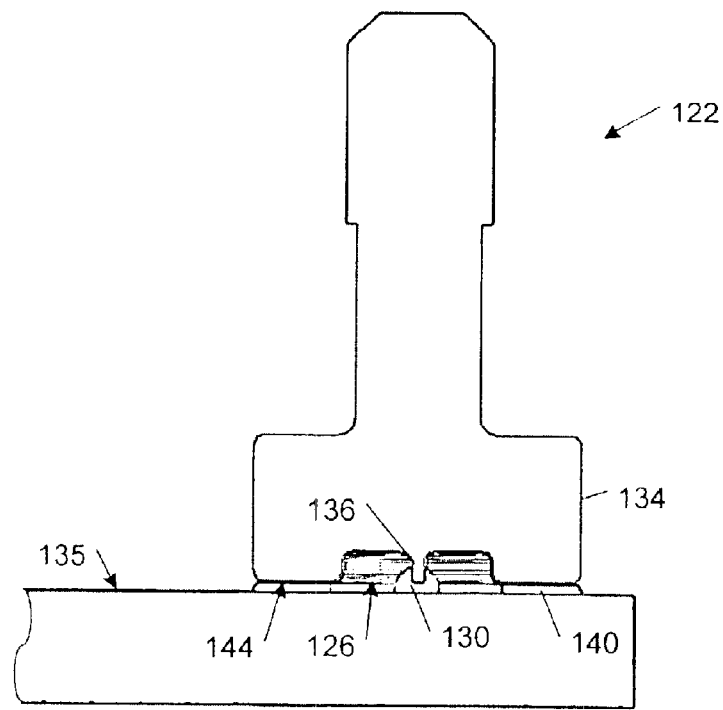
FIG. 10 is a diagrammatic side view of an alignment pin that has a recess containing a pin projecting from the bottom surface and a spherical tack weld element attached to the projecting pin.

Referring to FIGS. 9 and 10, in some embodiments, alignment pins 120, 122 may include recesses 124, 126 in the bottom surfaces of the flanged proximal ends 132, 134. Spherical tack weld elements 128, 130 may be attached to the support surface 135. Alignment pin 122 includes a pin 136 that projects from the bottom surface of recess 126. Before the alignment pins are attached to the support surface, solder ring preforms 138, 140 may be attached to either the bottom surfaces 142, 144 of the flanged proximal ends 132, 134 of alignment pins 120, 122 or to the support surface 135. Tack weld elements 128, 130 extend a higher distance above the support surface than the top surfaces of solder ring preforms 138, 140.

Solder ring preforms 138, 140 may be made of a metal solder (e.g., Sn), a conventional metal alloy (e.g., PbSn), or an intermetallic compound (e.g., AuSn, AuIn, AuGe, or SiC). Tack weld elements 128, 130 may be formed of gold. The substrate may be a gold plated silicon substrate. In the illustrated embodiment, tack weld elements 128, 130 each has a diameter that is on the order of about 500 micrometers and the solder weld preforms 138, 140 each has a thickness that is on the order of about 100 micrometers.

During the alignment pin tacking process, the alignment pins are connected to an electrical power supply. The alignment pins are lowered toward the support surface. When the tack weld elements 128, 130 contact the alignment. pins 120, 122, an electric current of sufficient magnitude melts the tack weld elements 128, 130. The electric current is turned off after the alignment pins 120, 122 are resting flat on the support surface. The tack weld elements 128, 130 hold the alignment pins 128, 130 to the support surface 135. The support surface and alignment pin assembly then may be heated in an oven to reflow the solder ring preforms 138, 140. The reflowed solder ring preforms 138, 140 form the strength part of the resulting joint, while the tack weld elements 128, 130 hold the alignment pins in place during reflow of the solder ring preforms 138, 140.

Figure 11A:
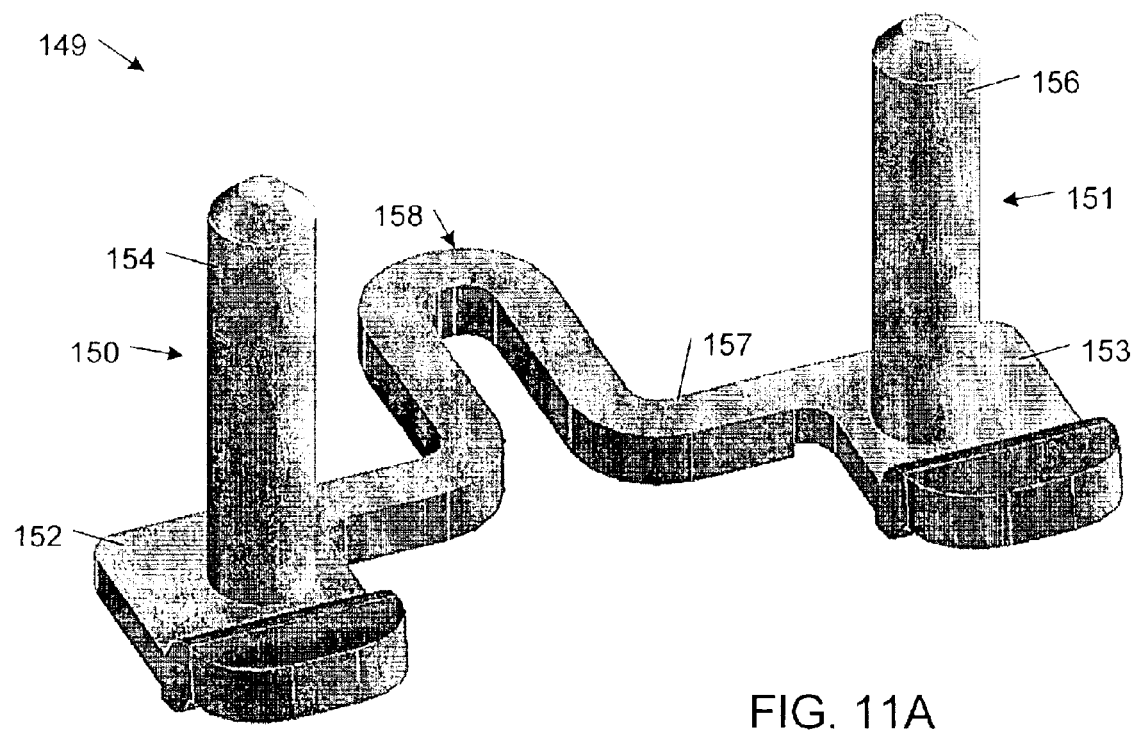
FIG. 11A is a diagrammatic perspective view of an alignment pin assembly that includes a pair of alignment pins that are interconnected by a resilient member.
Figure 11B:
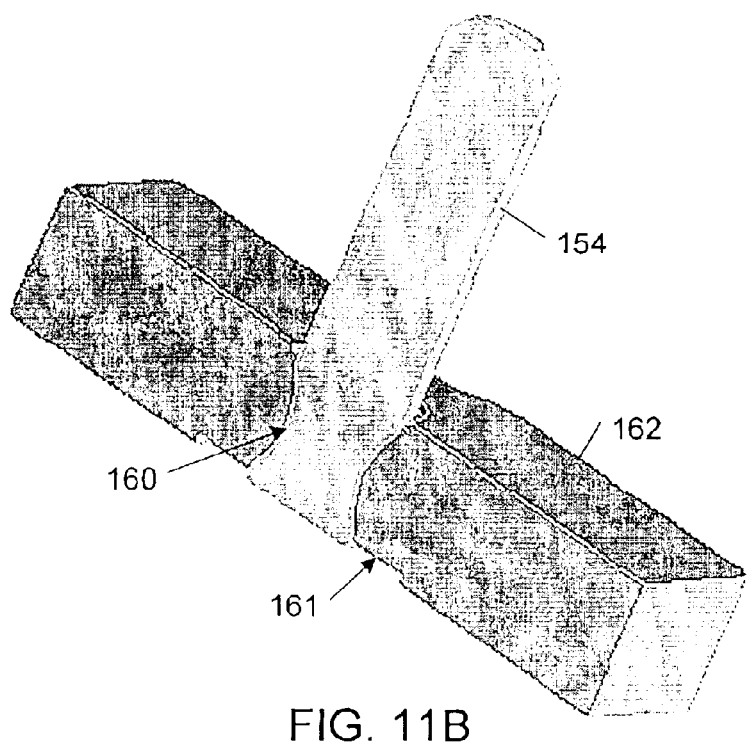
FIG. 11B is a diagrammatic cross-sectional side view of one of the alignment pins of FIG. 11A.

Referring to FIGS. 11A and 11B, in another embodiment, an alignment pin assembly 149 includes alignment pins 150, 151 that have rectangular flanged proximal ends 152, 153 and cylindrical distal ends 154, 156. Alignment pins 150, 151 are coupled together by a member 157, which is formed in a resilient structure (e.g., a thin metal). In the illustrated embodiment, member 157 includes a U-shaped spring region 158 that allows alignment pins 150, 151 to move toward and away from one another during alignment. In this way, member 157 may accommodate sizing deviations that might occur during fabrication of the alignment pin assembly 149 and, thereby, allows manufacturing tolerances to be reduced. As shown in FIG. 11B, the proximal and distal ends of each alignment pin 150, 151 may be separate components that are joined together. In the illustrated embodiment, each of the cylindrical distal ends of alignment pins 150, 151 include a narrowed (or undercut) region 160 and each of the rectangular flanged proximal ends 152, 153 includes a hole. During fabrication, the cylindrical distal ends are inserted within the holes in the rectangular proximal ends 152, 153. The flanged proximal ends 152, 153 then are swedged in the region 161 around the holes to displace flange material around the hole into the narrowed region 160 of the alignment pins. The resulting flanged alignment pins 150, 151 may be attached to a support surface using any one of the above-described attachment techniques or using an epoxy adhesive.

Figure 12A:
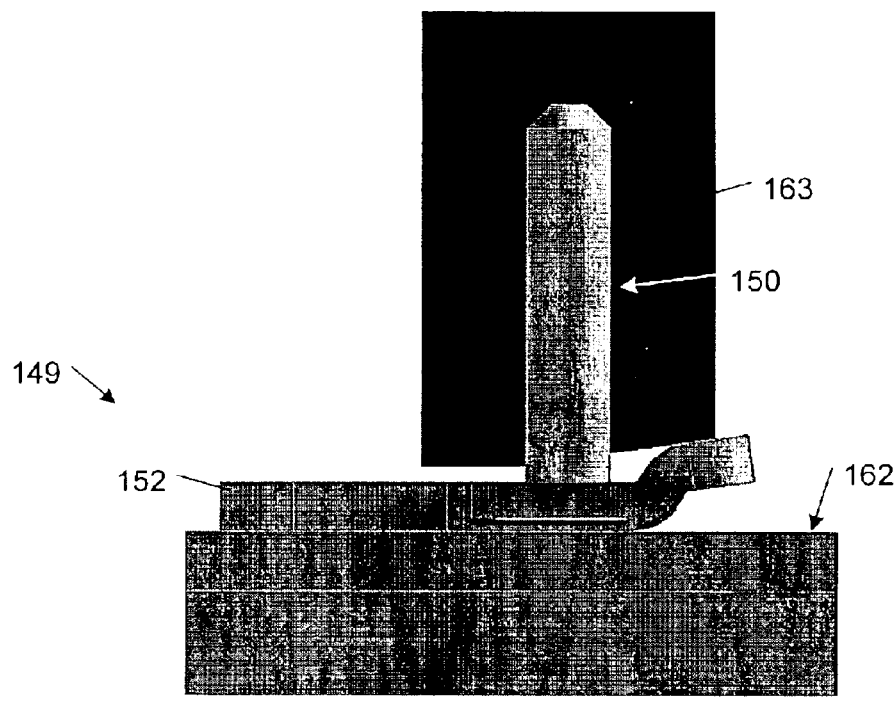
FIG. 12A is a diagrammatic cross-sectional side view of the alignment pin assembly of FIG. 11A held by a ferrule during an alignment process.
Figure 12B:
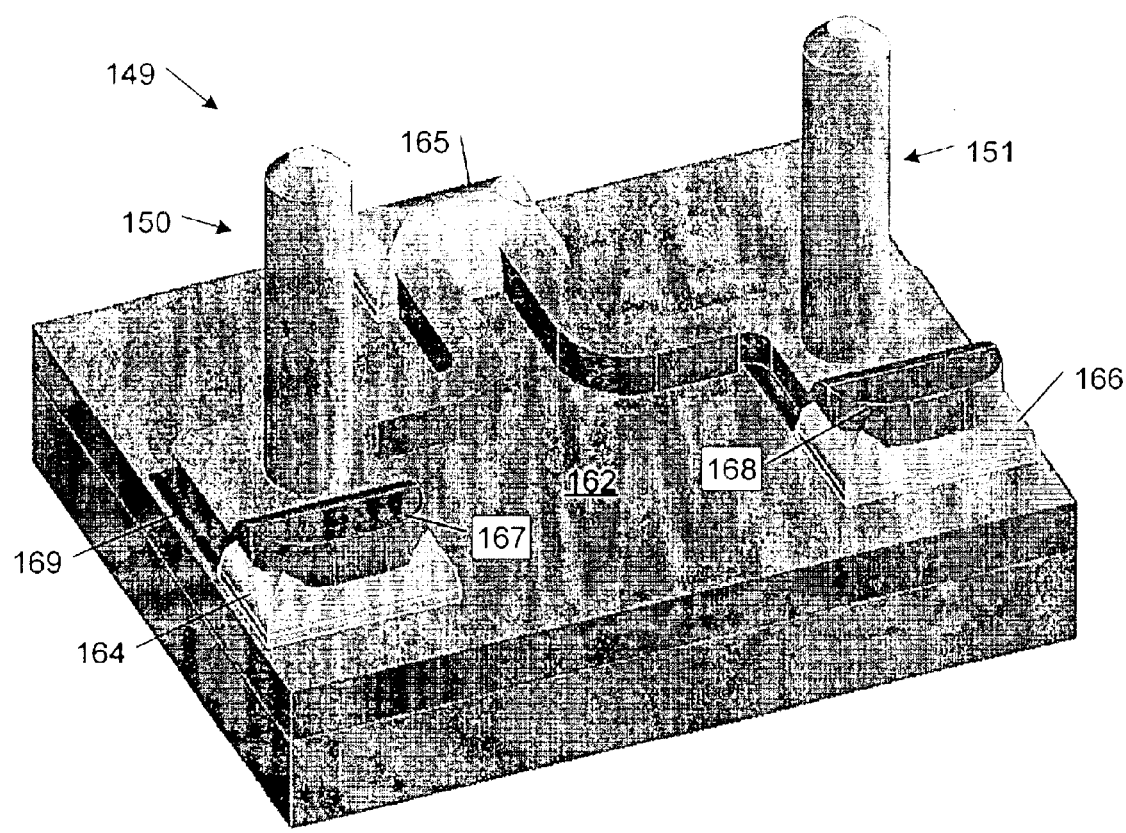
FIG. 12B is a diagrammatic perspective view of the alignment pin assembly of FIG. 11A bonded to a support surface of a fiber optic connector.

Referring to FIGS. 12A and 12B, in one embodiment, during attachment to a support surface 162, alignment pin assembly 149 may be held in a ferrule 163 and positioned over support surface 162 using a known active alignment process or a known visual alignment process. After alignment pin assembly 149 has been aligned with respect to support surface 162, alignment pin assembly 149 may be tacked in place using a conventional light-cure tacking adhesive 164, 165, 166. The flanged proximal ends 152, 153 of alignment pins 150, 151 may include respective regions 167, 168 that are bent away from support surface 162 to form with support surface 162 respective recesses that accommodate tacking adhesive 164, 166 therein. Subsequently, alignment pin assembly 149 may be bonded to support surface 162 with a conventional under-fill bonding adhesive 169.

Figure 13:
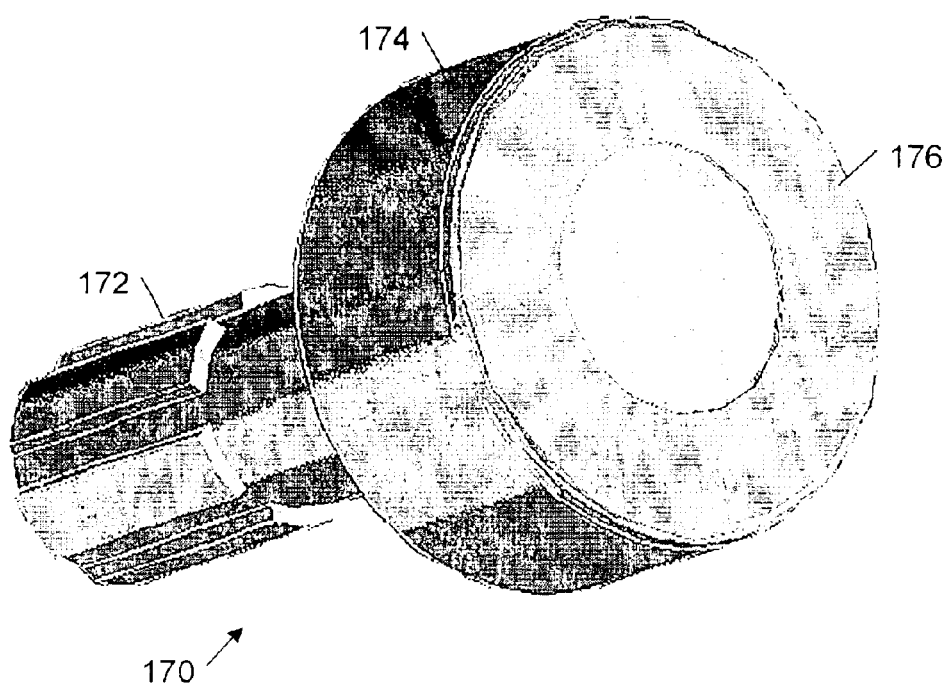
FIG. 13 is a diagrammatic perspective view of an alignment pin that has a fluted distal end and a flanged proximal end with a bottom surface coated with a thermal compression bonding material.

Referring to FIG. 13, in another embodiment, an alignment pin 170 includes a fluted distal end 172 and a cylindrical flanged proximal end 174 with a bottom surface having a thermal compression bonding layer 176. In the illustrated embodiment, the thermal compression bonding layer 176 is a ring-shaped layer that may be a plated layer or a preformed layer that is attached to the bottom surface of the flanged proximal end 174. The thermal compression bonding layer 176 may be formed of any known thermal compression bonding materials, such as gold.

III. Fabricating Flanged Alignment Pins

Figure 14A:
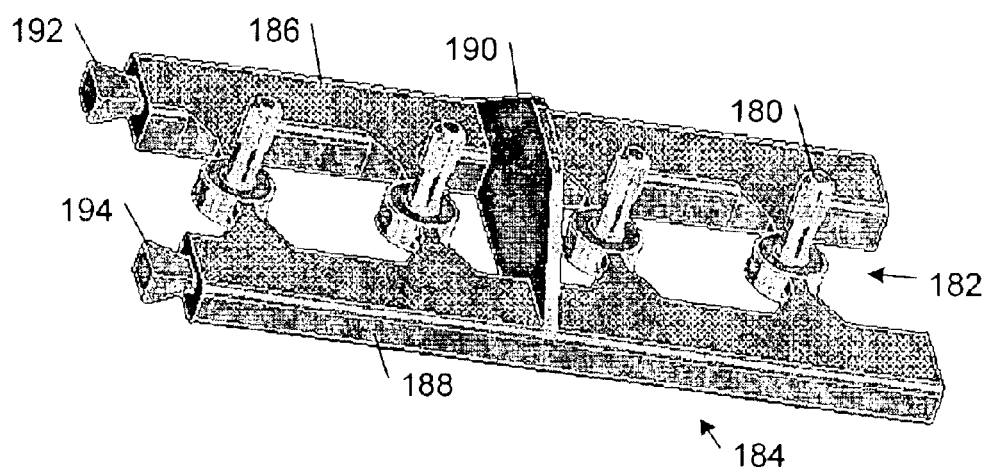
FIG. 14A is a diagrammatic perspective view of a set of alignment pins that are interconnected by a runner.
Figure 14B:
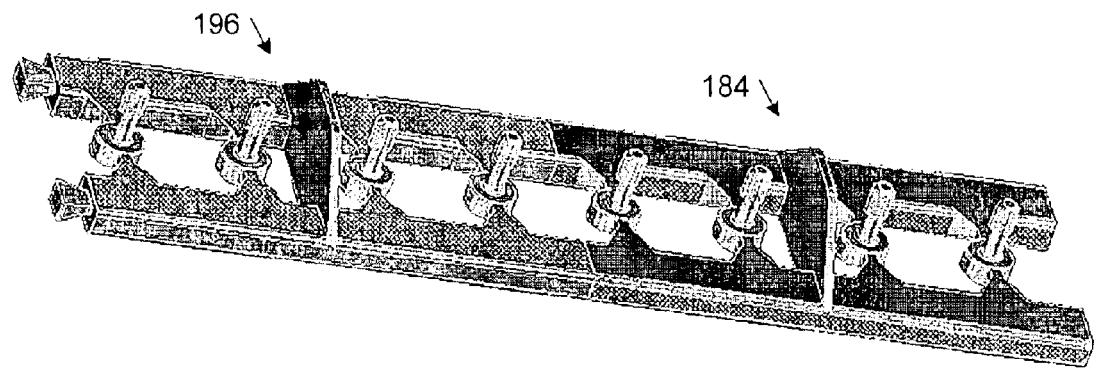
FIG. 14B is a diagrammatic perspective views of two alignment pin runners that are connected together.

Referring to FIGS. 14A and 14B, in some embodiments, alignment pins 180 are formed by a metal injection molding process. In these embodiments, the metal injection molding process involves forming multiple sets 182 of alignment pins 180 in sequence. Each set 182 of alignment pins 180 includes multiple (e.g. four in the illustrated embodiment) alignment pins 180 attached to a common runner 184. Each runner 184 includes a pair of parallel rails 186, 188 and a spacer 190 that is connected orthogonally between the pair of rails 186, 188. The runner 184 provides a convenient way to handle the interconnected alignment pins 180 during steps of the fabrication process, such as heat treating, sizing, sintering, and plating.

Each rail 186, 188 of runner 184 include a connector feature 192, 194 with an undercut. As shown in FIG. 13B, the rails of a subsequently formed runner 196 may be molded over the connector features 192, 194 of a preceding runner 184. The undercut of the connector features allow the runners 184, 196 to be locked together in a chain. The spacer 190 has a height above the rails that is greater than a corresponding height of the set of alignment pins 180 So that a continuous chain of runners may be collected into a roll without risk that overlying runners will contact the underlying alignment pins, preventing the alignment pins from being damaged during rolling and unrolling operations.

Figure 15:
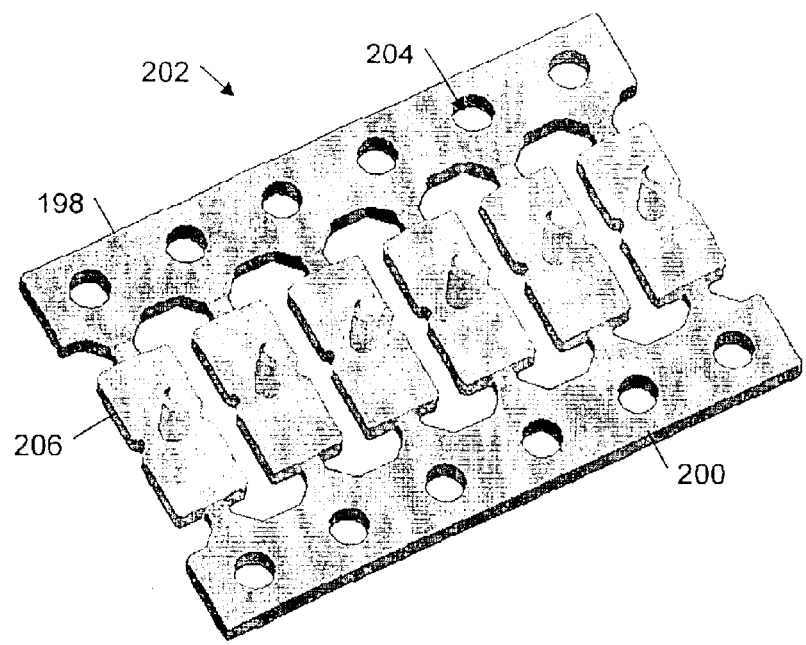
FIG. 15 is a diagrammatic perspective view of a set of alignment pins that are interconnected by a runner.

Referring to FIG. 15, in some embodiments, each of the rails 198, 200 of a runner 202 includes multiple regularly spaced holes 204 that may be used by automated equipment for indexing. As mentioned above, the runner 202 also provides a convenient way to handle the interconnected alignment pins 206 during steps of the fabrication process, such as heat treating, plating, and swedging.

IV. Other Embodiments

Other embodiments are within the scope of the claims.

For example, although the above embodiments are described in connection with optoelectronic transmitter devices, these embodiments readily may be incorporated into optoelectronic transceiver modules.

In addition, although the above embodiments are described in connection with fiber optic connectors with MT ferrules, these embodiments readily may be incorporated into any type of fiber optic connector that includes one or more alignment pins.

What is claimed is:

1. A fiber optic connector, comprising:
    a support surface with at least one optical communication port; and
    at least one alignment pin having an elongated distal end and a flanged proximal end with a bottom surface fixedly attached to the support surface.

2. The fiber optic connector of claim 1, wherein each alignment pin has at least one tack weld element bonded to the support surface.

3. The fiber optic connector of claim 2, wherein each tack weld element is a spot weld nub protruding from the bottom surface of the flanged proximal end.

4. The fiber optic connector of claim 3, wherein each spot weld nub tapers away from the bottom surface of the flanged proximal end.

5. The fiber optic connector of claim 4, wherein each spot weld nub has a conical surface.

6. The fiber optic connector of claim 3, wherein each alignment pin has three spot weld nubs protruding from the bottom surface of the flanged proximal end.

7. The fiber optic connector of claim 2, wherein each tack weld element protrudes from a recess in the flanged proximal end.

8. The fiber optic connector of claim 7, wherein each recess defines a volume larger than the volume of a tack weld element.

9. The fiber optic connector of claim 7, wherein each tack weld element has a spherical surface.

10. The fiber optic connector of claim 7, wherein each alignment pin further comprises a pin projecting from a bottom surface of the recess.

11. The fiber optic connector of claim 10, wherein a tack weld element is bonded to a projecting end of each pin projecting from the bottom surface of the recess.

12. The fiber optic connector of claim 2, further comprising a bonding compound disposed between the bottom surface of the flanged proximal end and the support surface.

13. The fiber optic connector of claim 12, wherein the bonding compound is an intermetallic compound.

14. The fiber optic connector of claim 12, wherein the bonding compound is disposed as a ring encircling a tack weld element.

15. The fiber optic connector of claim 1, wherein the elongated distal end of each alignment pin has a substantially cylindrical portion.

16. The fiber optic connector of claim 15, wherein the flanged proximal end of each alignment pin is substantially cylindrical with a larger diameter than the substantially cylindrical portion of the elongated distal end.

17. The fiber optic connector of claim 15, wherein the flanged proximal end of each alignment pin is substantially rectangular.

18. The fiber optic connector of claim 1, wherein each alignment pin is formed of a single component part.

19. The fiber optic connector of claim 1, wherein the distal end and the proximal end of each alignment pin are formed from separate component parts joined together.

20. The fiber optic connector of claim 1, wherein the flanged proximal end of each alignment pin has a stop edge against which a surface of a mating fiber optic connector rests when the elongated distal end is inserted into an alignment hole of the mating fiber optic connector.

21. The fiber optic connector of claim 20, wherein the stop edge is spaced from the support surface by a distance selected to optimize optical coupling between each optical communication port and a respective optical communication port of the mating fiber optic connector.

22. The fiber optic connector of claim 20, wherein the stop edge is constructed so that when resting against the stop edge the surface of the mating fiber optic connector is nonparallel to the support surface.

23. The fiber optic connector of claim 22, wherein the stop edge corresponds to a tapered surface, a wedge surface, or a bump.

24. The fiber optic connector of claim 1, wherein two alignment pins are fixedly attached to the support surface at respective locations selected to align each optical connection port with a respective optical communication port of a mating fiber optic connector.

25. The fiber optic connector of claim 1, wherein the proximal end of the at least one alignment pin has a bottom surface with at least one preliminary bonding feature.

26. The fiber optic connector of claim 1, wherein the at least one alignment pin is coupled by a resilient member to a second alignment pin having an elongated distal end and a flanged proximal end with a bottom surface.

27. A fiber optic connector, comprising:
    a support surface with at least one optical communication port; and
    a pair of alignment pins coupled together by a resilient member, and each alignment pin having an elongated distal end and a flanged proximal end with a bottom surface fixedly attached to the support surface.

28. The fiber optic connector of claim 27, wherein the resilient member includes a spring region constructed and arranged to allow the alignment pins to move preferentially toward and away from each other.

29. The fiber optic connector of claim 27, wherein the resilient member includes a bend in a plane substantially normal to the alignment pins.

30. The fiber optic connector of claim 27, wherein the flanged proximal ends of each alignment pin include respective regions that are bent up away from the support surface to form with the support surface respective recesses accommodating adhesive therein.

31. A method of making a fiber optic connector, comprising:
    providing at least one alignment pin having an elongated distal end and a flanged proximal end with a bottom surface; and
    fixedly attaching the proximal end bottom surface of each alignment pin to a support surface with at least one optical communication port.

32. The method of claim 31, wherein fixedly attaching comprises tack welding the proximal end bottom surface of each alignment pin to the support surface, and subsequently bonding each tack welded bottom surface to the support surface.

33. The method of claim 32, wherein bonding comprises back-flowing a bonding compound between each proximal end bottom surface and the support surface.

34. The method of claim 31, wherein the at least one alignment pin is coupled by a resilient member to a second alignment pin having an elongated distal end and a flanged proximal end with a bottom surface.

35. The method of claim 31, wherein the proximal end of the at least one alignment pin has a bottom surface with at least one preliminary bonding feature.

36. The method of claim 31, wherein providing at least one alignment pin comprises forming each alignment pin.

37. The method of claim 36, wherein forming each alignment pin comprises forming a fluted portion at the distal end of each alignment pin, and sizing the distal end of each alignment pin.

38. The method of claim 36, wherein each alignment pin is formed by metal injection molding.

39. The method of claim 38, wherein metal injection molding comprises forming multiple sets of alignment pins in sequence, each set of alignment pins comprising multiple alignment pins attached to a common runner.

40. The method of claim 39, wherein during formation each set of alignment pins is over-molded to a preceding, previously-formed set of alignment pins.

41. The method of claim 39, wherein each runner includes a pair of parallel rails and a spacer connected orthogonally between the pair of rails and having a height above the rails greater than a corresponding height of the set of alignment pins.

42. The method of claim 41, wherein each of the rails includes multiple regularly spaced indexing holes.

43. The method of claim 35, wherein each flanged proximal end of each alignment pin is formed with a stop edge against which a surface of a mating fiber optic connector rests when the elongated distal end is inserted into an alignment hole of the mating fiber optic connector.

* * * * *